United States Patent [19]

Dosjoub

[11] Patent Number: 5,029,468
[45] Date of Patent: Jul. 9, 1991

[54] ELEMENTS NECESSARY FOR THE EXCITATION AND THE MONITORING OF WHEEL MODULES IN A SYSTEM FOR MONITORING THE WHEELS OF A VEHICLE

[75] Inventor: Andre Dosjoub, Chamalieres, France

[73] Assignee: Compagnie Generale Des Etablissements Michelin - Michelin & CIE, Clermont-Ferrand, France

[21] Appl. No.: 499,284

[22] PCT Filed: Dec. 14, 1988

[86] PCT No.: PCT/FR88/00612
§ 371 Date: Jul. 12, 1990
§ 102(e) Date: Jul. 12, 1990

[87] PCT Pub. No.: WO89/05737
PCT Pub. Date: Jun. 29, 1989

[30] Foreign Application Priority Data

Dec. 16, 1987 [FR] France ................ 87 17696

[51] Int. Cl.$^5$ .................................. B60C 23/04
[52] U.S. Cl. ........................... 73/146.5; 340/448
[58] Field of Search ............. 73/146.5, 146.4; 340/448

[56] References Cited

U.S. PATENT DOCUMENTS

| | | | |
|---|---|---|---|
| 4,467,641 | 8/1984 | Abraham | 73/146.5 |
| 4,567,459 | 1/9186 | Folger et al. | 73/146.5 |
| 4,703,650 | 11/1987 | Dosjoub et al. | 73/146.5 |
| 4,737,761 | 4/1988 | Dosjoub et al. | 73/146.5 |
| 4,749,993 | 1/1988 | Szabo et al. | 73/146.5 |

FOREIGN PATENT DOCUMENTS

| | | |
|---|---|---|
| 0045401 | 2/1982 | European Pat. Off. . |
| 2577060 | 8/1986 | France . |
| 82/02249 | 7/1982 | World Int. Prop. O. . |
| 87/00127 | 1/1987 | World Int. Prop. O. . |
| 87/00129 | 1/1987 | World Int. Prop. O. . |
| 87/04123 | 7/1987 | World Int. Prop. O. . |

Primary Examiner—Donald O. Woodiel
Attorney, Agent, or Firm—Oblon, Spivak, McClelland, Maier & Neustadt

[57] ABSTRACT

A device for exciting and monitoring wheel modules for monitoring tires comprises control lines (5, 6) which excite simultaneously all the wheel modules except one, which is monitored. For this purpose, it comprises one exciting and monitoring assembly (2) per wheel. Each assembly (2) comprises an insulation transformer (20) of which the secondary (21) has a central point (21N) connected to earth. This arrangement ensures good electromagnetic compatibility and good insensitivity to radio frequencies.

7 Claims, 3 Drawing Sheets

ELEMENTS NECESSARY FOR THE EXCITATION AND THE MONITORING OF WHEEL MODULES IN A SYSTEM FOR MONITORING THE WHEELS OF A VEHICLE

This invention relates to the monitoring of the wheels of a vehicle, particularly the tires. In particular, it relates to the elements installed on the vehicle, i.e., in the stationary space or more precisely in the space not moving in rotation.

It relates to those monitoring systems comprising modules installed on each wheel to be monitored, connections between wheel and stationary space, for example, by antennas coupled inductively and, on the vehicle, elements assuring the overall operating of the system to provide a signal usable by the driver or by any alarm system, centralized or not.

Patent application No. W087/00127 proposes a coding making it possible to transmit the value of the pressure and the temperature of a tire from the wheel carrying said tire to the vehicle (stationary space). The coding described lends itself to the production of a transmission by inductive coupling. Patent application No. W087/00129 describes a way of accumulating and using the electric energy transmitted by an alternating current transmitted by inductive coupling. A device thus designed operates according to the following cycle: excitation of the module installed on the wheel by transmittal, from the vehicle, of an excitation, in which said wheel module will draw the energy necessary to its operating, then monitoring, on the vehicle, of the signal received in response to the excitation. This received signal comprises, by coding, the values of the parameters measured on the wheel. According to the design proposed by publication No. W087/00129, said signal is produced by the wheel module as soon as the excitation stops.

This invention has as its object to propose elements for excitation and monitoring of wheel modules which make it possible to reach as high a scanning speed as possible.

Another object of the invention is to propose a device as insensitive to the electromagnetic environment and radio frequency as possible, and which does not cause noise able to interfere with the electric equipment on board the vehicle.

Another object of the invention is to propose a device able to monitor the wheel module as quickly as possible after the end of the excitation.

To produce an excitation device whose performance data remain constant whatever the supply voltage of the battery of the vehicle may be is also another object of the invention.

The excitation and monitoring device according to the invention, usable for monitoring of the wheels of a vehicle, said device comprising for each wheel a module able to accumulate electric energy thanks to the transmission of a current by inductive coupling from the vehicle to said wheel, able to code the values of the parameters observed on a wheel, and able to transmit, by inductive coupling, the signal thus coded, an antenna attached coaxially to the wheel being connected to said module, said device being provided to be connected to one inspection antenna per wheel, said inspection antenna being attached to a part of the vehicle not moving in rotation so that the inductive coupling with the wheel antenna is approximately constant, is characterized in that it comprises per wheel, a unit assuring the production of the exciting current and the shaping of the signal received in response to the excitation, means of controlling the cycle of "excitation of wheel modules and monitoring of the latter" assuring the successive monitoring of each wheel and, simultaneously with said monitoring of a wheel, the excitation of at least one other wheel module which will be monitored in the following phase of the cycle, means assuring the processing of the received signal to extract from it said values.

The following figures illustrate the invention and make it possible to understand it well:

Figure 1:
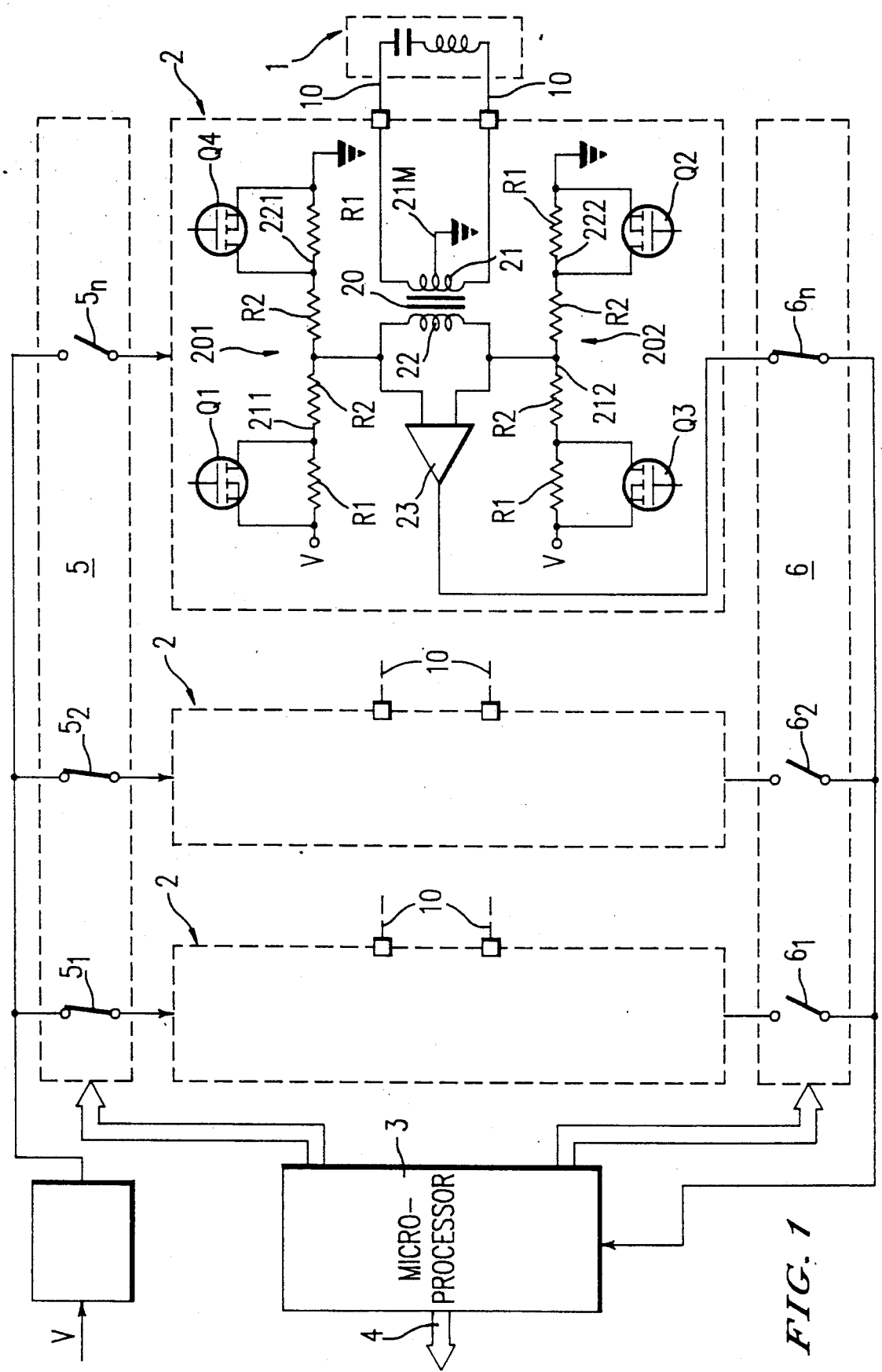
FIG. 1 is a general diagram of a device according to the invention.

In Fig. 1, an inspection antenna 1, intended to be coupled to a wheel antenna not shown (electromagnetic coupling), is seen. The device comprises one unit 2 per wheel of the vehicle. Each unit 2 assures the production of suitable exciting current, according to the design of the associated wheel module. In the case of a wheel module designed according to the teaching of document No. W087/00129, this exciting current is, for example, alternating. Each unit also assures the reception and the shaping of the signal sent by the wheel in response to the excitation. This signal carries the coded values of the measured parameters, for example, the pressure and the temperature of the tires mounted on the wheels. The output signal of each unit 2 is applied to a microprocessor 3 which assures its processing to extract the decoded values from the parameters observed on the wheel. The decoding is, of course, conditional on the coding type performed by the wheel module. These values can be sent to a display, or to another microprocessor for additional processing, or indeed else can be the object of other processings on the same microprocessor. Output 4 generally includes all these possibilities, which are not the object of this invention.

Microprocessor 3 also controls, via control channels 5 and 6, the functioning state of units 2. By channel 5, the "excitation" mode of units 2 is started, or, on the contrary, stopped. This is symbolized in FIG. 1 by circuit breakers 51, 52, ..., 5n, which, when they are closed, cause the transmittal of an exciting current by corresponding unit 2, and which, when they are open (like circuit breaker 5n on channel 5), leave the excitation at rest. At this time, corresponding unit 2 is able to monitor the signal received from the wheel. By control channel 6, the signal therefore is sent to microprocessor 3 during a sufficient time to be able to perform the decoding. The overall control by microprocessor 3 therefore assures the selection for the monitoring of a single wheel at one and the same time; it assures that, during the monitoring, there is no exciting current in corresponding unit 2, and it assures that the monitoring is selected just after an excitation phase, so that the wheel module has the energy necessary for its operation. By way of example, the simultaneous excitation of all the wheels except one (the $5n^{th}$ as diagrammed in FIG. 1), which is the one that is monitored by the microprocessor to perform the decoding, is assured, and all the wheels are selected successively for monitoring. In this way, the necessary excitation of the wheels is performed in time covered relative to the transmission phase of the measurements.

In FIG. 1, it is seen that each unit 2 comprises an isolating transformer 20 whose secondary 21 is connected to inspection antenna 1 and comprises a middle point 21M connected to the ground of the vehicle. The inspection winding consequently is connected to the ground of the vehicle only by this middle point 21M. In this way, connecting lines 10 between the circuits installed on the vehicle and various inspection antennas 1 can very simply consist of an ordinary two-wire cable. The recourse to a shielded cable is superfluous, without prejudice to the immunity of the device to noise. Lines 10 inevitably are routed through the entire vehicle to connect the wheels. They therefore are long and can come into contact with other electric equipment. Middle point 21M makes the currents or signals passing through the mesh of the circuit comprising this middle point 21M symmetrical, relative to the ground. By this assembly, the resulting electromagnetic field coming from two sources close to one another (the two wires necessary to each line 10) is zero. Also, the rejection of the common mode is excellent inside secondary 21. An excellent electromagnetic compatibility and a very low level of interferences in the radio frequencies result from this.

Each unit 2 comprises two branches 210, 202 connected in parallel between supply voltage V and the ground. Each branch 201, 202 consists of two resistive groups —211, 221, 212, 222—connected in series. Each group has an identical impedance and comprises at least one diminishing resistance $R_1$ in parallel to which there is connected a circuit breaker-forming means, for example, an electronic circuit breaker such as a transistor $Q_1$, $Q_2$, $Q_3$, $Q_4$. The terminals of primary 22 of transformer 20 are connected at middle points $M_1$ and $M_2$ defined are being the common terminal of each of two resistive groups 21X, 22X inside each branch 20X.

Figure 4A:
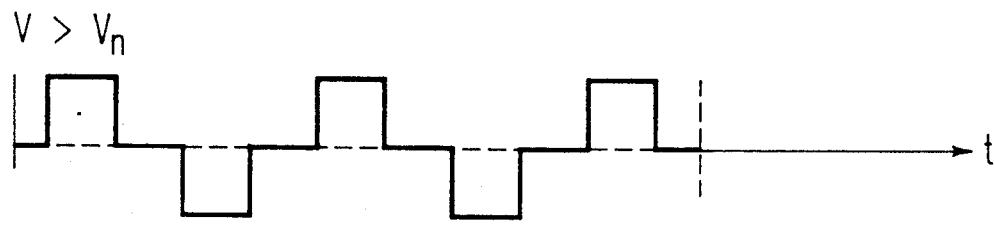
FIGS. 4a, 4b, 4c show the control of the excitation.
Figure 4B:
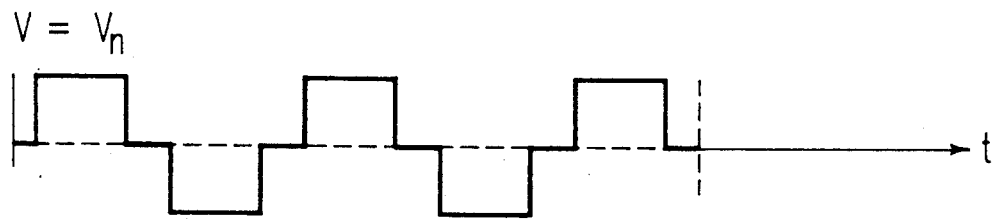
Figure 4C:
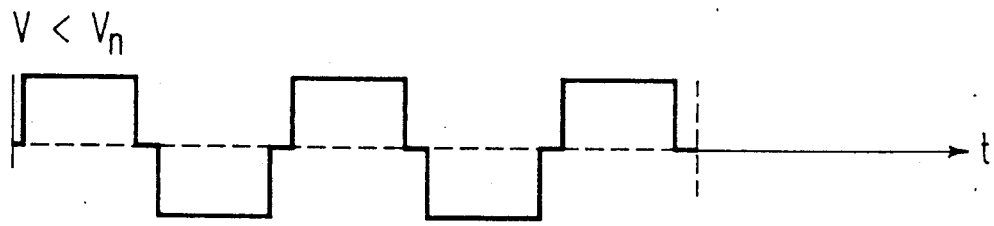

The exciting current is established by the following cycle: simultaneous closing of two circuit breakers: that of the group connected to the supply voltage of one branch—group 211 of branch 201—and that of the group connected to the ground of the other branch— group 222 of branch 202—, or closing of circuit breaker-forming means $Q_1$ and $Q_2$; then conversely by closing circuit breakers $Q_3$ and $Q_4$. FIGS. 4a, 4b, 4c show the control signal of said circuit breakers: the positive pulses control the closing of circuit breakers $Q_1$ and $Q_2$, for example, and the opposite sign pulses control the other circuit breakers. Advantageously, the width of said pulses decreases when voltage V of the battery of the vehicle increases. FIGS. 4b and 4c illustrate the increase of the duration of the pulses when the voltage of the battery decreases relative to the situation shown by FIG. 4a. In this way, the excitation energy can remain approximately constant whatever the voltage of this battery may be.

Preferably, each resistive group comprises a current limitation resistance $R_2$ in series with diminishing resistance $R_1$.

Figure 3:
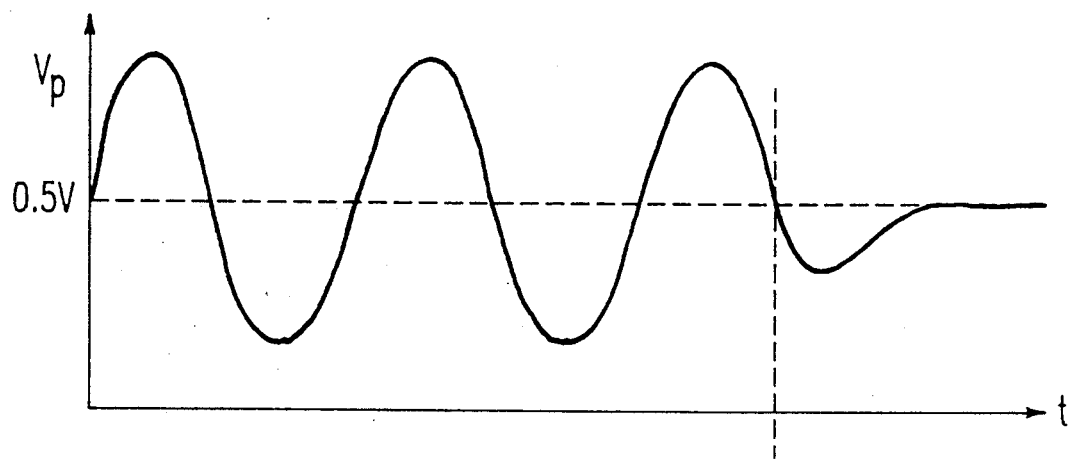
FIG. 3 is a timing diagram of a current determined in said unit.

The impedances of all the groups being identical, an approximately sinusoidal voltage $V_p$ (according to the value of the resistances and inductances), with a continuous component, appears at each terminal of the primary, and relative to the ground. The voltage shown in FIG. 3 is that appearing in terminal $M_1$ and the time scales of FIGS. 3, 4a, 4b, 4c correspond. The average value of said voltage $V_p$ is equal to 0.5 multiplied by V, if V is the supply voltage of unit 2. The voltage appearing in terminal $M_2$ is equal but in opposition of phase relative to that appearing in terminal $M_1$. Between the terminals of primary 22, an approximately sinusoidal alternating voltage therefore appears.

When all the circuit breakers are open, the excitation stops, and the wheel module immediately sends a coded signal, as proposed, for example, by patent application No. WO087/00129. On the other hand, the voltage to which each terminal of the winding constituting primary 23 of transformer 20 is brought is equivalent to 0.5 multiplied by V, or exactly the average value prevailing during the excitation. A very quick diminishing of the exciting current, as diagrammed by FIG. 3, results. The advantage of this arrangement resides in the fact that unit 20 thus is able extremely quickly to monitor the signal received from the wheel without being disturbed by the consequences of the excitation phase.

Figure 2:
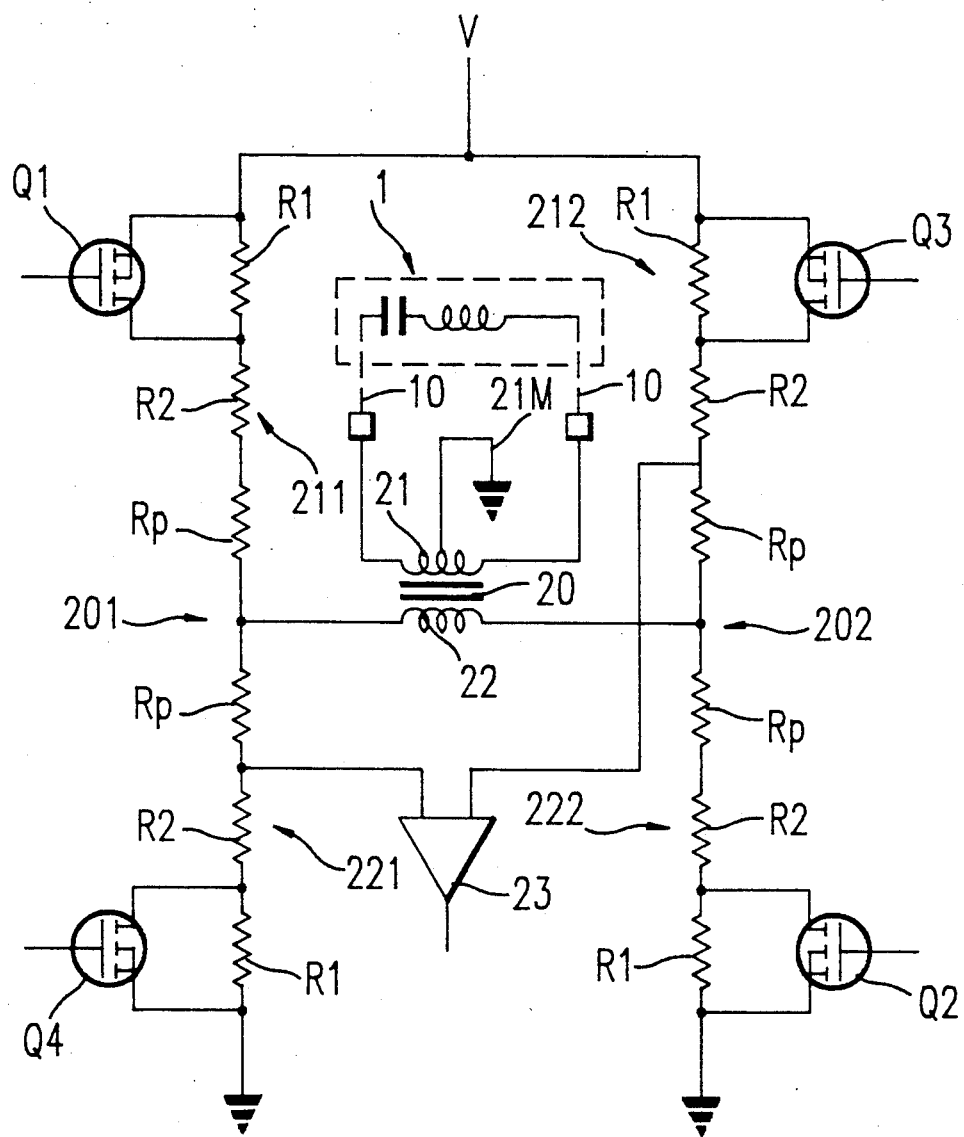
FIG. 2 shows in more detail a unit included in a device according to the invention.

The shaping of the received signal is performed by comparator 23 whose inputs are connected to the winding constituting primary 22. For comparator 23 automatically to filter all the parasitic signals, it is preferably connected to said winding via polarization resistances $R_p$, as can be seen in FIG. 2. At rest, a potential difference applied to the terminals of the comparator results, so that the latter switches only when the signal received at the terminals of said winding is greater than this potential difference. To preserve the symmetry of the diagram, such a polarization resistance $R_p$ therefore is introduced in each of four groups 211, 221, 212, 222. Of course at least those of these resistances $R_p$ used for the polarization of the inputs of comparator 23 should be connected to middle terminals $M_1$ and $M_2$.

The device thus designed makes possible a polling and a monitoring of the wheel modules of a tire monitoring system which is very reliable, quick, and compatible with the electric equipment of a vehicle.

I claim:

1. An excitaion and monitoring device for monitoring the wheels of a vehicle, said device comprising:

a module on each wheel for accumulating electric energy from the transmission of electrical current by inductive coupling with the vehicle, for sensing parameters on the wheel, for coding the values of the observed parameters and for transmitting by inductive coupling a signal including the coded values;

a wheel antenna attached coaxially to each wheel and connected to one of said modules;

an inspection antenna for each wheel being attached to a non-moving part of the vehicle so that an inductive coupling with the corresponding wheel antenna is approximately constant;

a unit for each wheel connected to one of said inspection antennas for producing the electrical current transmitted by inductive coupling and for shaping a signal received from said inspection antenna which is transmitted from said module through said wheel antenna in response to the electrical current being transmitted;

means for controlling said units to be successively actuated so that the wheels are successively monitored and so that the monitoring of a first wheel will be simultaneous with the excitation of a module of another wheel which is to be monitored next; and means for processing the signal to determine said values of the parameters.

2. An excitation and monitoring device for monitoring the wheels of a vehicle, said device comprising:

a module on each wheel for accumulating electric energy from the transmission of electrical current by inductive coupling with the vehicle, for sensing parameters on the wheel, for coding the values of the observed parameters and for transmitting by inductive coupling a signal including the coded values;

a wheel antenna attached coaxially to each wheel and connected to one of said modules;

an inspection antenna for each wheel being attached to a non-moving part of the vehicle so that an inductive coupling with the corresponding wheel antenna is approximately constant;

a unit for each wheel connected to one of said inspection antennas for producing the electrical current transmitted by inductive coupling and for shaping a signal received from said inspection antenna which is transmitted from said module through said wheel antenna in response to the electrical current being transmitted, said unit comprising an isolating transformer whose secondary is connected to one inspection antenna and having a middle point connected to ground;

means for controlling said units to be successively actuated so that the wheels are successively monitored; and means for processing the signal to determine said values of the parameters.

3. An excitation and monitoring device for monitoring the wheels of a vehicle, said device comprising:

a module on each wheel for accumulating electric energy from the transmission of electrical current by inductive coupling with the vehicle, for sensing parameters on the wheel, for coding the values of the observed parameters and for transmitting by inductive coupling a signal including the coded values;

a wheel antenna attached coaxially to each wheel and connected to one of said modules;

an inspection antenna for each wheel being attached to a non-moving part of the vehicle so that an inductive coupling with the corresponding wheel antenna is approximately constant; a unit for each wheel connected to one of said inspection antennas for producing the electrical current transmitted by inductive coupling and for shaping a signal received from said inspection antenna which is transmitted from said module through said wheel antenna in response to the current being transmitted, said units comprising two branches each having two resistive groups connected in series, said two branches being connected in parallel between a supply voltage and ground, each group having an identical impedance, each group comprising at least one diminishing resistance connected in parallel with a circuit breaker-forming means, the terminals of the inspection antenna being connected between the two groups of each branch to a middle terminal thereof, said current being produced by simultaneously closing the circuit breakers of the group connected to the supply voltage of one branch and the circuit breakers of the group connected to the ground of the other branch and shaping the received signal with a comparator connected to said middle terminals;

means for controlling said units to be successively actuated so that the wheels are successively monitored; and means for processing the signal to determine said values of the parameters.

4. Device according to claim 3, wherein said unit (2) further comprises an isolating transformer (20) whose secondary (21), connected to said inspection antenna (1), comprises a middle point (21M) connected to the ground of the vehicle, and whose primary is connected to said middle terminals of each of the two groups.

5. Device according to claim 3, wherein each group further comprises a limitation resistance $R_2$ in series with the other resistances of the group.

6. Device according to claim 3, wherein each group further comprises a polarization resistance $R_p$ in series with the other resistances of the group, the comparator for shaping the signal being connected to the primary winding via said polarization resistance of the group connected to the supply voltage of one branch and via said polarization resistance of the group connected to the ground of the other branch.

7. Device according to one of claims 4, 5, 6 or 10, wherein the circuit breaker-forming means are controlled by a pulse signal the width of said pulses depending inversely on the voltage of the battery of the vehicle, so that the excitation energy remains approximately constant when the voltage of the battery of the vehicle varies.

* * * * *

UNITED STATES PATENT AND TRADEMARK OFFICE
CERTIFICATE OF CORRECTION

PATENT NO. : 5,029,468

DATED : July 9, 1991

INVENTOR(S) : ANDRE DOSJOUB

It is certified that error appears in the above-identified patent and that said Letters Patent is hereby corrected as shown below:

Column 1, line 9, after "i.e." delete ",".

Column 3, line 29, delete "210" and insert --201-- therefor.

Column 4, line 41, delete "excitaion" and insert --excitation-- therefor.

Column 5, line 47, after ";", "a unit..." should begin a new paragraph.

Signed and Sealed this

Second Day of February, 1993

Attest:

STEPHEN G. KUNIN

*Attesting Officer*    *Acting Commissioner of Patents and Trademarks*